Dec. 5, 1961   J. J. DELANY ET AL   3,011,751
ELECTRICALLY OPERATED FLUSH VALVE
Filed March 18, 1957
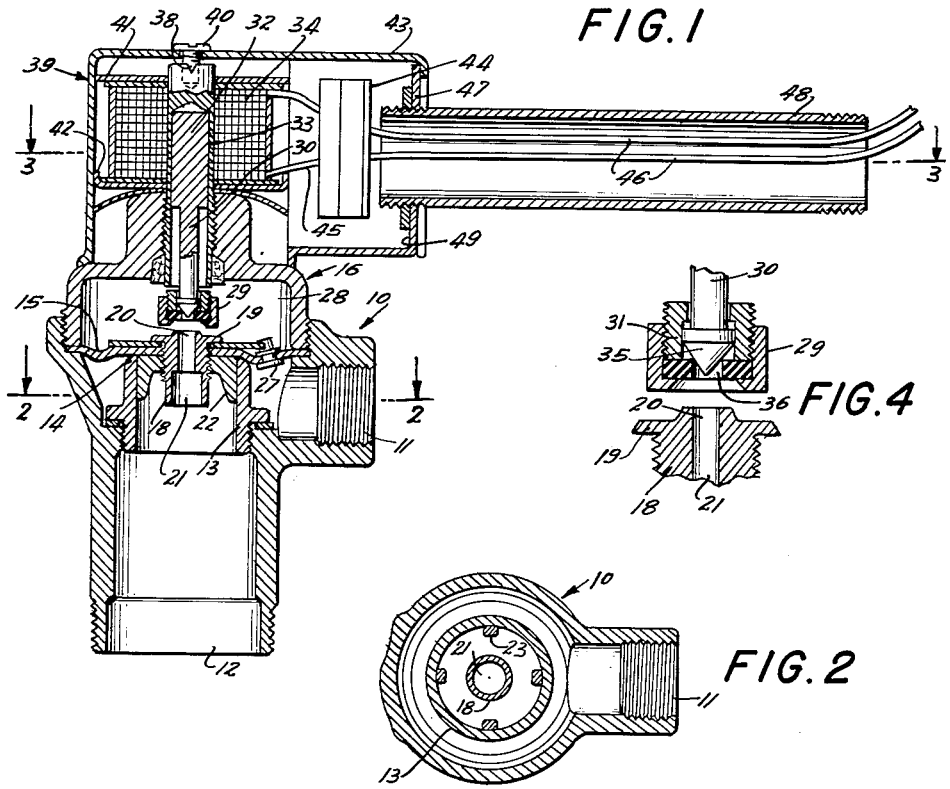
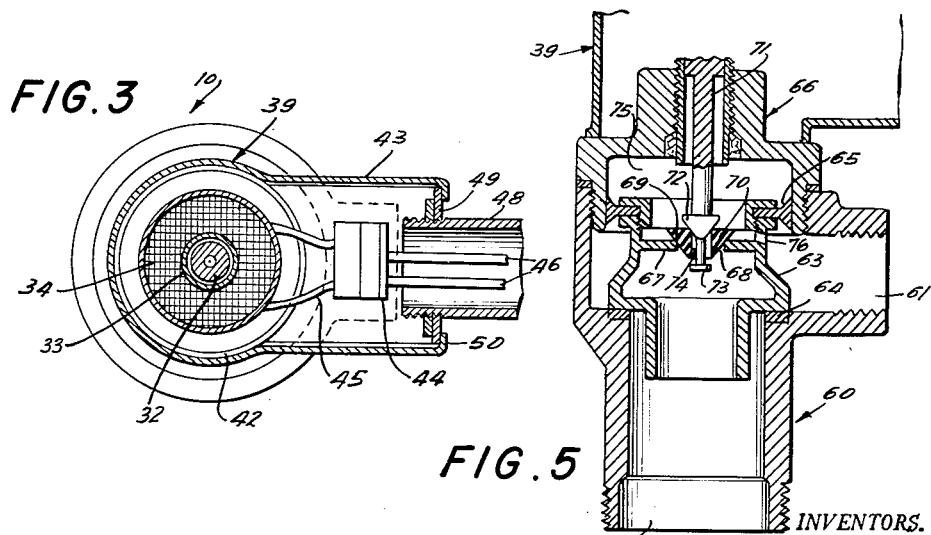
INVENTORS.
JOHN J. DELANY
EDWIN C. BAISEL
BY
Clark+Ott
ATTORNEYS

United States Patent Office 3,011,751
Patented Dec. 5, 1961

3,011,751
ELECTRICALLY OPERATED FLUSH VALVE
John J. Delany, Brooklyn, and Edwin C. Baisel, Queens, N.Y., assignors to Delany Realty Corporation, New York, N.Y., a corporation of New York
Filed Mar. 18, 1957, Ser. No. 646,604
1 Claim. (Cl. 251—30)

This invention relates to an electrically operated flush valve and the application is a continuation in part of application Serial No. 533,874 now abandoned.

An object of the invention is to provide an electrically operated flush valve which may be manually actuated or actuated through a timing mechanism to control the movement of a plunger functioning to open and close the valve.

Another object of the invention is to provide an electrically operated flush valve which is constructed to effect a reduction of the pressure on one side of the valve prior to the opening thereof for the flushing operation whereby the current required for actuating the valve plunger is reduced with a consequent reduction in the size of the wire in the coil of the electrically operating means.

A disadvantage in the use of electrically operated flush valves of the solenoid type has been the relatively large current required to move the plunger so as to require the use of a solenoid coil of relatively large wire and necessitating a large solenoid. This disadvantage is overcome in the present construction by means of main and auxiliary bleed ports which are successively opened by the plunger of the solenoid. The opening of the auxiliary bleed port by the initial movement of the plunger reduces the pressure above the main bleed port so as to effect rapid opening thereof.

Another object of the invention is to provide an electrically operated flush valve in which the plunger of the flush valve constitutes the core of the solenoid and is moved to open relation when the solenoid is energized.

Still another object of the invention is to provide means for controlling the movement of the stroke of the coil so as to control the duration of the flushing operation.

Still another object of the invention is to provide a housing for the solenoid which is mounted on the flush valve so as to permit of the convenient removal thereof for gaining access to the valve and for repair and replacement of parts.

Still another object of the invention is to provide an electrically operated flush valve which is applicable to diaphragm and piston type valves.

With the foregoing and other objects in view, reference is now made to the following specification and accompanying drawings in which the preferred embodiments of the invention are illustrated.

In the drawings:

FIG. 1 is a vertical sectional view of a flush valve provided with electrical means for moving the plunger to control the flow of water therethrough.

FIG. 2 is a sectional view taken approximately on line 2—2 of FIG. 1.

FIG. 3 is a sectional view taken approximately on line 3—3 of FIG. 1.

FIG. 4 is an enlarged fragmentary sectional view of the parts forming the main and auxiliary bleed ports with the parts shown in separated juxtaposition.

FIG. 5 is a fragmentary sectional view of a piston type flush valve constructed in accordance with the invention and illustrating a modified form of the valve elements of the main and auxiliary ports.

The invention is illustrated in FIGS. 1 to 4 inclusive of the drawings in its application to a flush valve of the diaphragm type. It is to be understood, however, that the invention is not so limited and is applicable also to flush valves of the plunger type.

The flush valve includes a body 10 having an inlet 11 and an outlet 12. Intermediate the inlet 11 and outlet 12 is a peripheral wall 13 threadedly connected with the valve body 10 and which provides a valve seat 14 for a diaphragm 15 secured at its periphery between the valve body 10 and a cover or cap 16. The diaphragm is centrally apertured and extending therethrough is a tube 18 having a flanged upper end 19 provided with a main bleed port 20 in communication with the flow passageway 21 through the tube 18. A ring member 22 threadedly engages the tube and clamps the diaphragm between the same and the flanged upper end 19. The ring member 22 is formed with radial guides 23 which slideably fit the inner face of the peripheral wall 13. The diaphragm 15 is provided with a by-pass 27 through which water flows from the inlet 11 to the chamber 28 above the diaphragm so as to equalize the pressure on the opposite sides thereof and maintain the diaphragm in seated engagement on the seat 14.

The flow passageway 21 is normally closed by a closure member 29 loosely mounted on the lower end of a plunger 30. The plunger 30 slideably protrudes into closure member 29 and is extended through a bushing or sleeve 31 threadedly engaged inside the upper end of closure member 29; recited supra as "loosely mounted" on the lower end of a plunger 30 terminating in a shouldered conical auxiliary bleeder valve 35. It will be noted that the shoulder of conical valve 35 is comparatively narrow and of shallow depth, being loosely fitted inside closure member 29. The lower end 35 of plunger 30 is loosely retained inside of closure member 29 by the lower end of bushing 31. The necessities of a loose fit between the lower end 35 of plunger 30 providing ample clearance space to permit slight reciprocation of conical valve 35 inside member 29. The necessary clearance space around plunger 30 and valve 35 provides a restricted annular passage to permit liquid in pressure chamber 28 to flow around the plunger 30 and valve 35 thence thru bleeder port 36 and passage 21 when valve 35 is open.

The adjustable sleeve 33 is shown to be threadedly inserted into an opening in the cover or cap 16 with the upper end of the plunger provided with a soft iron core 32. The core 32 is mounted for sliding movement within the sleeve 33 which is now non-magnetic and surrounded by a solenoid coil 34 which is disposed in axial alignment with the passageway 21. The core 32 and plunger 30 are moved upwardly within the sleeve 33 when the coil is energized and descends by gravity when the coil is deenergized.

The fragmentary detail as of FIG. 4 shows:

The plunger 30 formed with a stem terminating in a shouldered conical lower end forming an auxiliary bleed valve 35, said stem slidably inserted thru an externally threaded bushing having a shoulder projecting radially inward of the upper end of the opening thru the bushing and located spaced concentrically above the shoulder of said bleed valve, said bushing inserted into an internally threaded outer sleeve as at 29 formed with a shoulder projecting radially inwardly of the lower end of the opening thru the sleeve, a replaceable seat washer having an auxiliary bleed port 36 therethru and being impinged between the lower end of said bushing and the internal shoulder of said sleeve, the inside of the lower end of said sleeve being tapered to form guide means for and to conform with the coniform outside of a projecting valve seat surrounding a main bleed port 20 disposed thru the flanged end 19 of a bushing 18 adapted to be inserted thru the outlet side of the main valve of a pressure operated flushometer.

When the solenoid is energized, the plunger will be lifted to open the auxiliary bleed port 36 to thereby reduce the pressure within the closure member 29 whereupon continued upward movement of the plunger functions to quickly raise the closure member 29 from closed relation with the main bleed port 20. The water in the chamber 28 will then be discharged through the flow passageway 21 and the diaphragm will be moved out of engagement with the valve seat 14 to permit of the flow of water from the inlet beneath the diaphragm and the discharge thereof through the outlet 12. When in fully open relation, the diaphragm is disposed against the closure member 29 to close the main bleed port 20 and the closure member 29 will be forced against the plunger 30 to close the auxiliary bleed port 36. When the solenoid is deenergized, the plunger and closure member 29 will descend with the diaphragm with the main and auxiliary bleed ports 20 and 36 in closed relation whereupon the upper chamber 28 will be filled with water flowing through the by-pass 27 and the diaphragm will be moved to closed relation with the valve seat 14.

The sleeve 33 is adjustable in the threaded opening in the cover or cap 16 to control the stroke of the plunger whereby the duration of the flushing operation may be varied. For this purpose the upper end of the sleeve is provided with a kerf or slot 38 for engagement by a suitable tool for varying the relative position of the sleeve.

The solenoid coil 34 is enclosed within a casing 39 which is secured by a set screw 40 onto the top of the cover or cap 16. The solenoid coil 34 loosely fits the sleeve 32 and is retained in position within the casing 39 by upper and lower disks 41 and 42 snugly fitting the inner face of the casing 39.

The casing 39 is formed with a rectangular extension 43 which forms a junction box for a coupling 44 connecting the terminal wires 45 of the coil 34 and the conductor wires 46 leading to a source of current supply. This permits of the convenient coupling of the terminal and conductor wires so as to compensate for any misalignment of the flush valve with the opening in the wall through which the conductor wires protrude. The extension 43 of the casing is open at the bottom and side which openings are closed by an L shaped member 47 secured to the outer end of the usual pipe 48 arranged in the wall and through which the electrical wires extend. The L shaped member is adapted to seat on the cap 16 so as to close the bottom opening and with the angulated side 49 closing the side opening. The angulated side 49 engages within the inturned side portions 50 of the extension 43. It will be understood that the casing 39 may be readily removed from the flush valve and the L shaped member 47 by unscrewing the set screw 40 without disturbing the pipe 48 or the flush valve. This permits of convenient access to the electrical coupling 44 and repair or replacement of the coil as well as permitting of the adjusting of the sleeve 33 to change the stroke of the plunger so as to vary the duration of the flushing operation.

Instead of the diaphragm 15, the flush valve may be of the piston type as shown in FIG. 5 of the drawings. The valve body 60 is similar to the valve body 10 in the previous form of the invention and includes an inlet 61 and an outlet 62. Arranged within the valve body intermediate the inlet and outlet is a piston 63 of general cylindrical formation which is mounted for sliding movement within the valve body and adapted to engage an annular seat 64 to close off the flow of water through the valve. The upper end of the piston is provided with an annular member 65 of compressible rubber composition which slidably engages against the inner periphery of the upper portion or cap 66 of the flush valve. The piston is formed with a partition wall 67 which is centrally apertured to provide a flow passageway 68 surrounding a valve seat 69. The valve seat is adapted for engagement by a conical shaped valve element 70 provided on the lower end of a plunger 71 similar to the plunger 30 in the previous form of the invention. The valve element 70 loosely fits the lower end of the plunger between a conical shaped valve element 72 and a stop 73 spaced therefrom. The conical shaped valve element 70 is centrally apertured as at 74 to provide an auxiliary bleed port, while the flow passageway 68 provides a main bleed port.

The operation of the piston type flush valve is similar to that hereinbefore described for the operation of the diaphragm type valve. When the solenoid is energized, the plunger 71 will be lifted to open the auxiliary bleed port 74 to thereby reduce the pressure in the chamber 75 above the piston 63 whereupon continued upward movement of the plunger functions to quickly raise the conical shaped valve element 70 from closed relation with the main bleed port 68. The water in the chamber 75 will then be discharged through the flow passageway 68 and the piston 63 will be moved out of engagement with the valve seat 64 to permit of the flow of water from the inlet 61 and the discharge thereof through the outlet 62. When the solenoid is deenergized, the plunger 71 will descend to close the main and auxiliary bleed ports 68 and 74. The chamber 75 will then be filled with water flowing through a by-pass 76 and the piston 63 will be moved to closed relation to shut off the flow through the flush valve.

There is thus provided in both forms of the invention an electrically operated flush valve having main and auxiliary bleed ports which being closed successively reduces the force required to raise the plunger. This permits of the use of a solenoid coil of finer wire so as to reduce the size of the coil. Furthermore, the current required to lift the plunger is materially reduced by the successive closing of the auxiliary and main ports to thereby reduce the likelihood of the coil burning out.

While the preferred forms of the invention have been shown and described herein, it is to be understood that the same is not so limited but shall cover and include any and all modifications thereof which fall within the purview of the invention.

What is claimed is:

An electrically operated flush valve including a valve body having inlet and outlet openings, a partition wall between said inlet and outlet openings having a central opening thru which the water flows from the inlet opening to the outlet opening, a movable diaphragm wall in said valve body adapted to seat on said partition wall for closing off the flow of water thru said central opening, the movable wall forming one side of a water chamber between said movable wall and the upper part of said valve body, said movable wall having a main bleed port communicating from said chamber to said outlet, a by-pass provided for the flow of water from the inlet opening to said chamber and being of less cross-sectional area than an auxiliary bleed port provided for said main bleed port, a solenoid coil mounted in axial alignment with the main bleed port combined with a sleeve slidably mounted within said coil and having its lower end threadedly engaging the upper end of said valve body, said sleeve having an upper end wall formed integrally therewith and closing the upper end thereof for preventing leakage of moisture to said coil thru the upper end of said sleeve, a plunger slidably mounted in said sleeve with the upper end thereof providing a core for said coil and having a conical shaped auxiliary bleed valve element at its lower end, an annular closure member loosely fitted to the conical end of said plunger, connected with and for moving said annular closure member with said plunger permitting slight reciprocatory movement of the conical shaped valve element with reference to said annular closure member, same being independent of said movable wall and having an apertured bottom wall providing said auxiliary bleed port, same being disposed in alignment with said main bleed port, said conical shaped valve element closing said auxiliary bleed port and said annular closure member closing said main bleed port when said movable wall is in closed relation with said central opening, said movable wall being moved to open relation with reference to said central opening by pressure of the inlet fluid when the annular closure member is moved to open relation by energizing the solenoid, said movable wall when in fully open relation being urged against said annular closure member to thereby close said main bleed port and force said annular closure member against said conical shaped valve element to close said auxiliary bleed port, said movable wall, said annular closure member and plunger moving in unison with the movement of said movable wall in closed relation with said central opening upon increase of pressure in said chamber, said plunger being raised to move the conical shaped valve element from closed relation with said auxiliary bleed port when the solenoid is energized to thereby decrease the pressure on the chamber side of said movable wall, whereby said annular closure member may be readily raised from the closed relation with said main bleed port by the upward movement of the plunger, the threaded engagement between the sleeve and valve body permitting adjustment of said sleeve axially of said coil for controlling the stroke of the plunger to thereby vary the duration of the flushing operation.

References Cited in the file of this patent

UNITED STATES PATENTS

| | | |
|---|---|---|
| 628,671 | Newman | July 11, 1899 |
| 1,110,412 | Utne | Sept. 15, 1914 |
| 1,297,836 | Gulick | Mar. 18, 1919 |
| 1,807,970 | Davis | June 2, 1931 |
| 2,020,833 | Hansen | Nov. 12, 1935 |
| 2,360,612 | Ludeman | Oct. 17, 1944 |
| 2,562,315 | Kempton | July 31, 1951 |
| 2,575,272 | Harris | Nov. 13, 1951 |
| 2,625,953 | Miller | Jan. 20, 1953 |
| 2,657,005 | Van Nest | Oct. 27, 1953 |
| 2,694,544 | Hall | Nov. 16, 1954 |
| 2,754,840 | Hicks | July 17, 1956 |

FOREIGN PATENTS

| | | |
|---|---|---|
| 699/26 | Australia | 1926 |
| 518,044 | Canada | 1955 |